US010950138B1

(12) United States Patent
Herron

(10) Patent No.: US 10,950,138 B1
(45) Date of Patent: Mar. 16, 2021

(54) DRUMMING FITNESS SYSTEM AND METHOD

(71) Applicant: Brian J. Herron, Dexter, MI (US)

(72) Inventor: Brian J. Herron, Dexter, MI (US)

(73) Assignee: Herron Holdings Group LLC, Dexter, MI (US)

( * ) Notice: Subject to any disclaimer, the term of this patent is extended or adjusted under 35 U.S.C. 154(b) by 109 days.

(21) Appl. No.: 15/486,023

(22) Filed: Apr. 12, 2017

(51) Int. Cl.
*G09B 15/06* (2006.01)
*A63B 24/00* (2006.01)
*A63B 71/06* (2006.01)
*G09B 19/00* (2006.01)
(Continued)

(52) U.S. Cl.
CPC .......... *G09B 15/06* (2013.01); *A63B 24/0003* (2013.01); *A63B 24/0062* (2013.01); *A63B 71/0686* (2013.01); *G09B 19/003* (2013.01); *G10H 3/146* (2013.01); *H05B 47/12* (2020.01); *A63B 2071/0625* (2013.01); *A63B 2220/20* (2013.01); *A63B 2220/40* (2013.01); *A63B 2220/62* (2013.01); *A63B 2220/806* (2013.01); *A63B 2220/833* (2013.01); *A63B 2230/75* (2013.01); *G10H 2220/185* (2013.01)

(58) Field of Classification Search
CPC ........ G09B 15/06; G09B 19/00; G09B 16/06; G09B 19/003; A63B 24/00; A63B 71/06; A63B 24/0003; A63B 71/0686; G10H 3/14; H05B 37/02
See application file for complete search history.

(56) References Cited

U.S. PATENT DOCUMENTS 5,739,457 A * 4/1998 Devecka ............... A63F 13/005
434/307 A
6,075,197 A * 6/2000 Chan .................... G10H 1/0008
84/730

(Continued)

FOREIGN PATENT DOCUMENTS

KR 20180046237 A * 5/2018 ....... H01L 21/67051

OTHER PUBLICATIONS

De La Rue et al., Investigation into the rate of energy expenditure of rock/pop drumming (Year: 2013).*
(Continued)

*Primary Examiner* — Eddy Saint-Vil
(74) *Attorney, Agent, or Firm* — Gardner, Linn, Burkhart & Ondersma LLP

(57) ABSTRACT

A drumming exercise method and system involves detecting the striking of a surface with a drum stick by a user, and calculating a calorie expenditure of the user based on the detection. The system may be configured as a digital drum machine having drum pads and sensors operatively connected with the drum pads, and a processor that receive signals from the sensors to detect the striking of a surface with a drum stick. Alternatively, the system may be configured as drum sticks that include a sensor and a processor, with the sensor detecting the striking of a surface and the processor transmitting information thereon to calculate an expenditure of calories. Still further, the system may comprise a digital video camera and computer with recognition software, with the camera capturing images of a user performing drumming motions, and the computer detecting the striking via the recognition software.

18 Claims, 1 Drawing Sheet

(51) Int. Cl.
*G10H 3/14* (2006.01)
*H05B 47/12* (2020.01)

(56) References Cited

U.S. PATENT DOCUMENTS

| | | | | |
|---|---|---|---|---|
| 6,399,869 | B1* | 6/2002 | Sagastegui | G10H 1/0016 |
| | | | | 84/104 |
| 6,545,207 | B2* | 4/2003 | McAfee | G09B 15/00 |
| | | | | 84/470 R |
| 6,695,694 | B2* | 2/2004 | Ishikawa | A63F 13/10 |
| | | | | 463/7 |
| 7,604,571 | B2* | 10/2009 | Wilkins | A63B 5/00 |
| | | | | 434/247 |
| 7,964,780 | B2* | 6/2011 | Hotta | G10H 1/0083 |
| | | | | 84/104 |
| 9,227,128 | B1* | 1/2016 | Carfagna, Jr. | A63B 69/32 |
| 2006/0136173 | A1* | 6/2006 | Case, Jr. | A63B 24/00 |
| | | | | 702/182 |
| 2006/0279294 | A1* | 12/2006 | Cehelnik | G08B 13/26 |
| | | | | 324/662 |
| 2008/0096726 | A1* | 4/2008 | Riley | A63B 24/0006 |
| | | | | 482/8 |
| 2009/0258686 | A1* | 10/2009 | McCauley | A63F 13/06 |
| | | | | 463/7 |
| 2011/0172060 | A1* | 7/2011 | Morales | A63B 69/004 |
| | | | | 482/8 |
| 2012/0088222 | A1* | 4/2012 | Considine | G09B 5/00 |
| | | | | 434/362 |
| 2012/0108394 | A1* | 5/2012 | Jones | A63B 69/004 |
| | | | | 482/8 |
| 2013/0118339 | A1* | 5/2013 | Lee | G10H 1/32 |
| | | | | 84/725 |
| 2013/0217979 | A1* | 8/2013 | Blackadar | A61B 5/0024 |
| | | | | 600/301 |
| 2013/0239785 | A1* | 9/2013 | Tabata | G10H 1/0008 |
| | | | | 84/609 |
| 2013/0247747 | A1* | 9/2013 | Yamada | G10H 3/146 |
| | | | | 84/723 |
| 2014/0275852 | A1* | 9/2014 | Hong | A61B 5/02427 |
| | | | | 600/301 |
| 2014/0324459 | A1* | 10/2014 | Barfield | G06F 19/3418 |
| | | | | 705/3 |
| 2016/0081620 | A1* | 3/2016 | Narayanan | A61B 5/4866 |
| | | | | 600/483 |
| 2016/0093278 | A1* | 3/2016 | Esparza | G10H 3/143 |
| | | | | 84/615 |
| 2016/0203806 | A1* | 7/2016 | Hardi | G10D 13/003 |
| | | | | 84/600 |

OTHER PUBLICATIONS

Hall et al., Energy Expenditure of Walking and Running Comparison with Prediction Equations, Medicine & Science in Sports & Exercise, Dec. 2004 (Year: 2004).*

Burning Calories with Exercise: Calculating Estimated Energy Expenditure, retrieved from the internet at https://www.hss.edu/conditions_burning-calories-with-exercise-calculating-estimated-energy-expenditure.asp (Year: 2009).*

Kanke et al., Airstic Drum: A Drumstick for Integration of Real and Virtual Drums, Advances in Computer Entertainment (pp. 57-69) (Year: 2012).*

* cited by examiner

DRUMMING FITNESS SYSTEM AND METHOD

BACKGROUND OF THE INVENTION

The present invention is directed to a drumming fitness system, and in particular to a system in which the activity level of a user of drums and/or drumsticks is determined to provide exercise feedback to the user.

SUMMARY OF THE INVENTION

The present invention provides a drumming fitness system, including drums and/or drumsticks that determine the activity level of the user and provide feedback thereto.

According to an aspect of the present invention, a drumming exercise method comprises detecting drumming motions of an elongate object, such as the striking of a surface with a drum stick by a user, and calculating a calorie expenditure of the user based on the detection of the striking. In a particular embodiment, a drumming exercise system for performing the method comprises a digital drum machine comprising one or more drum pads, with sensors operatively connected with the drum pads, and a processor operable to receive signals from the sensors.

In a particular embodiment the sensors detect the intensity of strikes to the drum pads, which is used in the calculation of the calorie expenditure. The system may further include a determination of the pattern in which the drum pads are struck, and an estimation of the distance moved by the user between the drum pads based on the determination of which drum pads are struck. This in turn may be used in calculating the calorie expenditure by the user. Still further, an amount of time between the striking of the drum pads may be determined and used in the calculation of the calorie expenditure.

The system may additionally include lights associated with the drum pads, with the lights being used to prompt the user to strike the drum pads in a particular pattern, such as in a programmed pattern or in a pattern synchronized to music. A transmitter may also be included in the system to transmit information to a separate computing device, such as transmitting a calculated expenditure of calories. The system may further include a receiver to receive audio input signals, such as to prompt the user regarding patterns to play, and/or may include an audio output.

In a further embodiment, a drumming exercise system for performing the method comprises drum sticks that are used by the user to strike a surface or surfaces, with the drum sticks including an integrated sensor or sensors for detecting the strikes. The sensor may comprise a motion sensor, such as an accelerometer. The sensors may additionally detect the intensity of each strike of a surface with the drum sticks, with the intensity determination used in the calculating of the calorie expenditure. The sensors may further be used to determine the distance each of the drum sticks is moved between strikes, with the distance determination being used in the calculating of the calorie expenditure. Still further, a determination of the time between strikes of the drum sticks may be determined and used in the calculation of the calorie expenditure. The weight of the drum sticks may also be used in calculating the calorie expenditure. Signals may also be provided to the user to prompt when and which drum stick to strike, such as via lights or haptic feedback devices.

In a still further embodiment, a drumming exercise system comprises a digital video camera and a computer that includes recognition software. The camera records motions of a user striking a surface with the drum stick, with the recognition software operative to detect the striking of the surface.

The various systems may additionally be used to determine a profile of a user based on motions and patterns of striking surfaces with drum sticks, with the system identifying the user based on a user profiled determined from the motions and patterns.

The present invention provides an exercise system and method that combines the activity of drumming with fitness to promote the enjoyment of both activities and spurn improvement to both drumming abilities and the fitness level of a user. These and other objects, advantages, purposes and features of this invention will become apparent upon review of the following specification in conjunction with the drawings.

DESCRIPTION OF THE PREFERRED EMBODIMENTS

Figure 1:
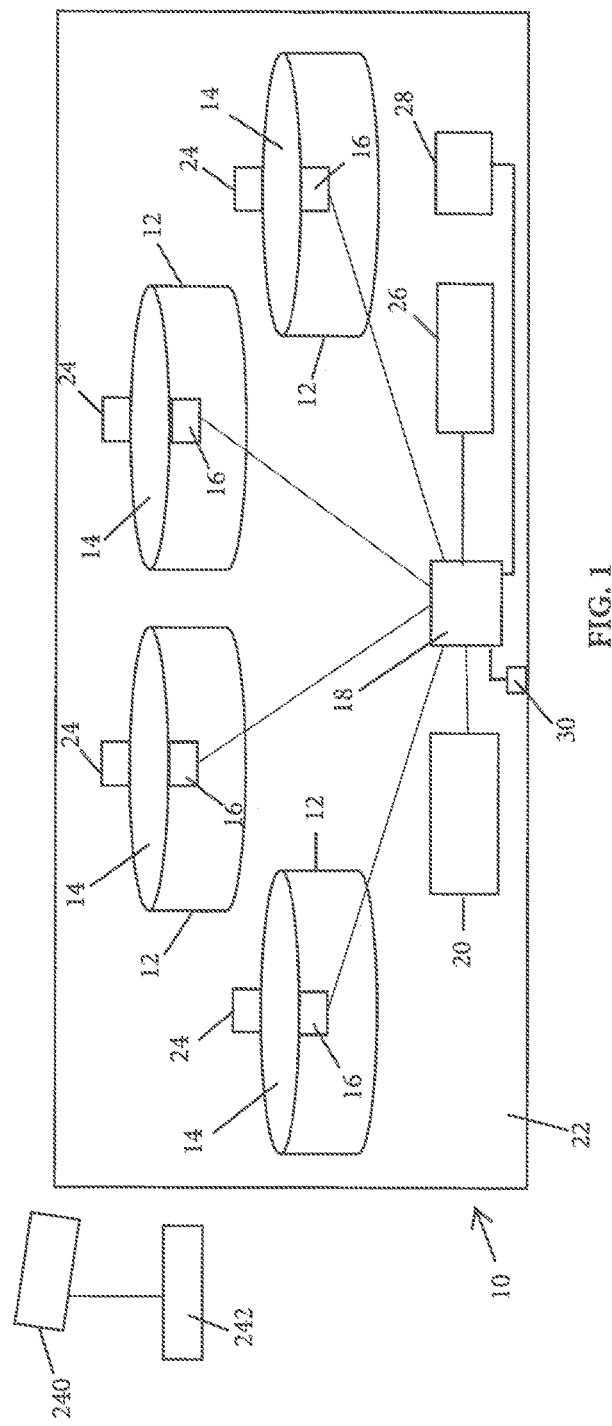
FIG. 1 is an illustration of drums in accordance with the present invention.

The present invention will now be described with reference to the accompanying figures, wherein the numbered elements in the following written description correspond to like-numbered elements in the figures. A drumming exercise system configured as a drum set 10 comprising multiple drum pads 12 in accordance with an embodiment of the present invention are disclosed in FIG. 1, where drum pads 12 each include a striking surface 14 to which is operatively connected a force or striking sensor 16 that detects when striking surface 14 is hit, such as by conventional drumsticks made of wood or plastic, and is configured to detect the amount of force with which striking surface 14 has been hit. Drum set 10 in the illustrated embodiment comprises a digital drum machine and additionally includes a processor or control 18, such as a microprocessor with software, which receives signals from sensors 16 and, based on the impact detection of sensors 16, control 18 calculates an energy expenditure associated with the amount of force of the impact on striking surfaces 14. As such, an output can be provided to a user regarding the amount of energy expended, such as via a display 20 indicating an amount of calories burned while performing drumming routines.

In the illustrated embodiment, drum set 10 comprises four separate drum pads 12 that are mounted to a base or housing 22. Each drum additionally includes a light 24, with lights 24 being additionally electrically connected with processor 18. Lights 24 may be illuminated by processor 18 in particular patterns to direct a user which drum pad 12 to strike. For example, processor 18 may be programmed to direct a sequence or pattern of lights 24, including with the sequence of lights 24 being associated and set to music whereby a user plays along with the music, or provides the drumming portion of particular songs. To this end, one or more speakers 26 may be provided to provide audible feedback to the user of the strikes to surfaces 14, where the speaker 26 may output sounds associated with the striking of a particular drum pad 12 and/or additionally output sounds associated with a song to which a user is playing the accompanying drum portion.

Still further, rather than playing pre-recorded music programs via processor 18, drum set 10 may be configured to receive music as an input, with drum set 10 operable to receive audible sounds, such as via speaker 26 with speaker 26 incorporating a microphone, and/or receive digital music as an input to processor 18. In such an embodiment, processor 10 is operable to detect beats in the sound/music received as an input and, in turn, selectively illuminate lights 24 based thereon. Drum set 10 is further constructed to allow a user to operate the drum set 10 at different levels of difficulty or intensity, such as levels between basic, to intermediate, to advanced, to provide a more challenging workout and/or accommodate different skill levels. This may be based on, for example, faster rates and/or requiring more difficult patterns or combinations of drum pads to be struck.

Sensors 16 may be configured as any of various types of sensors for detecting a strike, including sensors that may provide a proportional output to the force thereof. Accordingly, sensors 16 may comprise accelerometers, piezoelectric devices, strain gauge based devices, or other known such sensors. It should be further appreciated that although drum pads 12 are illustrated as equipped with a single sensor 16, that each drum pad 12 may be equipped with a plurality of sensors 16, such as disposed underneath striking surface 14. Likewise, although each drum pad 12 is illustrated as equipped with a single light 24 disposed adjacent striking surface 14, it should be appreciated that multiple lights 24 may be provided, including having lights 24 arranged beneath striking surface 14. In such an embodiment, striking surface 14 enables light to be seen there through, such as by being transparent or translucent, whereby visible light illuminated there beneath is visible to a user. The striking surface 14 of each drum pad 12 may thus include multiple effective striking surfaces.

As noted, processor 18 determines an amount of calories burned or expanded by a user, including based on which drum pads 12 are struck and how often, including the rate at which drum pads 12 are struck, such as the number of times per minute. Still further, the determination by processor 18 may take into account a known distance between each drum pad 12 as they are struck and the intensity of each hit when determining the amount and/or rate of calories being burned. In embodiments employing multiple sensors 16 beneath each striking surface 14, processor 18 is able to determine calorie expenditure by a user based on an actual distance moved between each strike.

Processor 18 may additionally be configured to record and store information related to individual users, such as in nonvolatile memory of drum set 10. This may include performances by individual users from which profile information may be derived, including skill level, common motions, patterns and intensities of striking. Based thereon, drum set 10 may recognize a user and be operative to establish target goals for a user for a given workout. Alternatively, a user may input to processor 18 information related to a goal, such as based on time or a given calorie expenditure target. In any such scenario, when a user has reached a target goal, such as based on time or calories, drum set 10 may provide a sensory notification to the user, such as by illuminating lights 24, or some other type of visual, audible, or haptic feedback. Processor 18 may additionally or alternatively record information regarding calorie expenditures, including time expended, patterns played, and the like, such as in nonvolatile memory, separate from identifying a user profile.

The drumming exercise system of drum set 10 may also have a transmitter 28, such as a USB, Bluetooth, WiFi, or other standardized interface to transmit results, recordings, audio, and other data to a personal computer, mobile device, or the internet. The system could also have a music output 30 such as Mini-RCA or Bluetooth so the operator could listen to percussion tones as they strike the pads. The system could be configured as a digital drum set with pads spaced in the traditional locations for a drummer. The system could also be configured as a drum rack that attaches to exercise equipment such as a treadmill or other fitness equipment. Moreover, although shown in FIG. 1 has having a single processor 18 with multiple drum pads 12, the system 10 may include multiple processors 18, such as one for each drum pad 12. Likewise, drum set 10 may be configured to have more than four or less than four drum pads 12, or may be configured to include a single drum pad 12. Still further, although discussed above in regard to playing with or to music, it should additionally be understood of course that drum set 10 may alternatively be used for free play whereby a user strikes the drum pads 12 according to the user's own desired beat.

As noted above, drum set 10 is configured for use with conventional drum sticks constructed of wood or plastic and which would have an outer profile substantially similar to the outer shape of drum sticks 112 shown in FIG. 2 and discussed below. Such conventional drum sticks comprise an elongate object held by a user for drumming. It should be understood, however, that drum set 10 may be struck with alternative elongate objects such as, for example, elongate wands constructed of plastic or wood that do not have a separate bulbously shaped tip and shaft, where the shaft narrows down to a shoulder or neck above the tip, as shown by the conventional shape of drum sticks 112 in FIG. 2. Thus alternative elongate objects of varying shapes, sizes and lengths may be employed with drum set 10.

Figure 2:
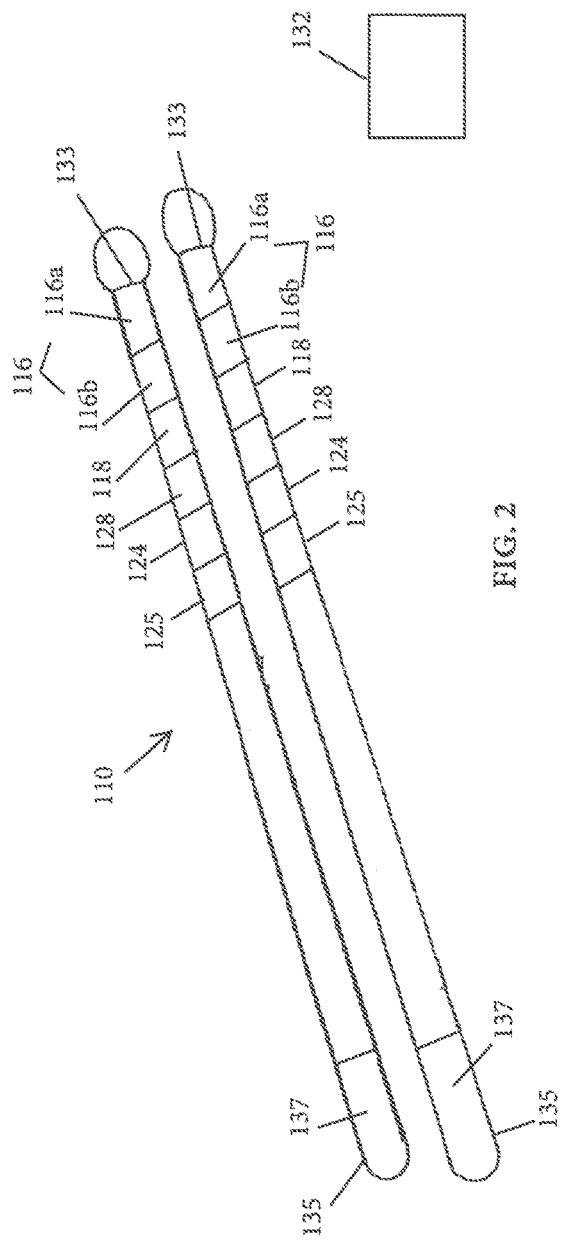
FIG. 2 is a perspective view of drum sticks in accordance with the present invention that are usable by themselves, with the drums of FIG. 1, or with alternative drums.

Referring now to FIG. 2, an alternative embodiment of a drumming exercise system in accordance with the present invention is shown depicting a drumming exercise system integrated as a set or pair of drum sticks 110, with the set of drum sticks 110 comprising individual drum sticks 112. Each drum stick 112 includes an integrated sensor 116 and a processor 118, with sensing and processing of a user's striking of a surface or surfaces with drum sticks 112 being measured and processed to determine a calorie expenditure that is then provided to the user, including for example based on the weight of the drum sticks 112. The drumming exercise system of FIG. 2 thus differs from the drumming exercise system of FIG. 1 in that all of the sensing and processing occurs in the drum sticks 112 rather than in the drum pads 12 and/or drum set 10. Thus, drum sticks 112 may thus be struck on any surface, including a conventional acoustic drum set, with all of the measurements being taken and processed accordingly. Drum sticks 112 may further accommodate drumming or striking motions wherein a user does not actually strike a surface with the drum sticks 112, but instead makes a drumming motion, which may otherwise be referred to as "air drumming", wherein the drum sticks 112 are moved rapidly to experience repetitive changes in movement that is detected via sensor 116, such as through corresponding detectable acceleration changes. Drum sticks 112 otherwise operate substantially as set forth as discussed above with regard to drum set 10, including to capture the same information, such as user recognition, determining a player's profile, and setting of levels of difficulties and goals. As such, not all of the features of drum sticks 110 will be discussed herein.

Sensors 116 of drum sticks 112 may comprise multiple sensors, including force detecting sensors 116*a*, such as discussed above relative to sensor 16. Additional sensors may be included as well, such as motion sensors 116b, such as accelerometers, thereby enabling the tracking of the overall movement of a drum stick 112 as it is repetitively moved by a user between striking of a surface. More data may thus be collected regarding the exercise session. It should be appreciated that the determinations are thus estimates of the actual distances moved and forces or intensities of strikes based on the collected data.

Drum sticks 112 may additionally include a wireless transmitter 128 to transmit data taken from sensors 116 to a computer or mobile device 132, such as via Bluetooth or the like. The transmitter 128 may additionally be used to provide sounds to a user, such as to a mobile electronic device that provides sounds to a user through headphones, earbuds, or the like. Drum sticks 112 may additionally include a light 124 and/or a haptic device 125, such as a vibrator device, to provide feedback to the user, such as upon a drum stick 112 being struck against a surface and/or upon reaching a predetermined goal. The light 124 and/or haptic device 125 may additionally be used to signal to a user when to strike a surface and with which drum stick 112.

Each drum stick 112 is formed to have the shape of a conventional drum stick, but in the illustrated embodiment includes internal sensors 116, processors 118 and transmitters 128 within an internal compartment of drum sticks 112. Drum sticks 112 further include a battery compartment 135 within which one or more batteries 137 may be retained for providing power to sensors 116, processors 119 and transmitters 128.

Referring now again to FIG. 1, yet another alternative drumming exercise system 210 is shown which comprises a sensor configured as a digital camera 240 operatively connected to a computer 242, where camera 240 is used to obtain video images of a user performing drumming exercises and transmit the recorded video images to computer 242. Computer 242 in turn includes recognition algorithms, including to detect drumming motions, as well as facial recognition to detect a user. Although drumming exercise system 210 is illustrated in FIG. 1 adjacent drum set 10, it should be appreciated that system 210 is independent of drum set 10 and/or drum sticks 110. That is, drumming exercise system 210 may be employed with conventional acoustic drum sets and/or conventional drum sticks made of plastic or wood. Still further, drumming exercise system 210 may be employed with other elongate objects, such as wands of wood or plastic, that do not have an outer profile shape of conventional drum sticks. Drumming exercise system 210 may additionally be used to detect drumming or striking motions in which a surface is not actually struck with an elongate object, but instead a user makes a drumming motion, which may otherwise be referred to as "air drumming", wherein the user moves the elongate objects rapidly to experience or cause repetitive changes in movement that is detected via motion recognition algorithms of computer 242, such as through detecting of changes in direction, speed and/or orientation. It should be understood that such detection algorithms are known in the art, including optic flow algorithms, tracking algorithms, structure from motion algorithms, and the like. System 210 may be configured to provide all of the features of drum set 110 and/or drum sticks 110, including determination of calorie expenditures, setting of goals, determination of user profiles, providing of sounds to a user upon detecting the striking of a surface, and the like.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A drumming exercise method comprising:
   providing a set of drum sticks configured to be held and moved by a user;
   providing a digital drum machine comprising a plurality of drum pads defining striking surfaces and a plurality of sensors with at least one said sensor being operatively connected with each said drum pad to detect when said striking surfaces are struck;
   detecting drumming motions of said drum sticks via said sensors when said drum sticks are moved by a user to strike said striking surfaces;
   receiving, by a processor, signals from said sensors when said sensors detect that said striking surfaces are struck by said drum sticks;
   using known distances between each of said striking surfaces to estimate in said processor a distance each of said drum sticks is moved between the drumming motions of each said drum stick when the user strikes said drum pads in a pattern;
   determining an amount of time between the drumming motions of each said drum stick; and
   calculating with said processor a calorie expenditure of the user based at least on the estimated distance each of said drum sticks is moved between the drumming motions of each said drum stick and the amount of time between the drumming motions of each said drum stick.

2. The method of claim 1, wherein said sensors detect an intensity of strikes to each said drum pad and provide a proportional output of the force thereof to said processor, and wherein said calculating with said processor the calorie expenditure of the user further comprises calculating with said processor the calorie expenditure of the user based on the output of the force of the strikes to each said drum pad.

3. The method of claim 1, further comprising:
   determining which of said drum pads are struck by the user when the user strikes said drum pads in a pattern.

4. The method of claim 1, further comprising:
   determining an amount of time between when individual ones of said drum pads are struck by the user when the user strikes said drum pads in a pattern.

5. The method of claim 1, wherein said digital drum machine further comprises a plurality of lights, wherein said lights are operatively associated with said drum pads, wherein the method further comprises illuminating said lights in a pattern to prompt the user to strike said drum pads in the pattern.

6. The method of claim 1, wherein said digital drum machine includes a transmitter, and wherein the method further comprises transmitting data from said processor to a separate computing device.

7. The method of claim 1, wherein said digital drum machine includes a receiver and an audio output, and wherein the method further comprises (1) receiving audio input signals with said receiver to provide prompts to the user regarding percussion patterns to play, or (2) playing percussion tones, by the audio output, for the user to listen to or record.

8. The method of claim 1, further comprising providing signals to the user to prompt the user regarding when or where to strike a surface with said elongate object.

9. The method of claim 1, further including a digital video camera and a computer with said computer including recognition software and being configured to receive digital images from said digital video camera, and wherein said detecting drumming motions of said drum sticks further comprises recording movement of said drum sticks with said digital video camera and using said recognition software to detect drumming motions of said drum sticks.

10. A drumming exercise method comprising:
providing a set of drum sticks configured to be held and moved by a user with each said drum stick including a motion sensor;
detecting drumming motions of each said drum stick via the respective said motion sensor when each said drum stick is moved by the user;
transmitting, from each said motion sensor, said detecting of the drumming motions to a processor communicatively coupled to said motion sensors;
determining, by the processor, a distance each said drum stick is moved between the drumming motions of each said drum stick using said motion sensor of each said drum stick;
determining an amount of time between the drumming each said drum stick; and
calculating with the processor a calorie expenditure of the user based at least on the estimated distance each of said drum sticks is moved between the drumming motions of each said drum stick and the amount of time between the drumming motions of each said drum stick.

11. The method of claim 10, wherein said motion sensors comprise accelerometers.

12. The method of claim 10, further comprising sensing an intensity of each strike of a surface with said drum sticks.

13. The method of claim 12, wherein said calculating with said processor the calorie expenditure of the user further comprises calculating with said processor the calorie expenditure of the user based on the intensity of each strike of a surface with said drum sticks.

14. The method claim 10, wherein a weight of said drum sticks is known.

15. The method of claim 11, wherein said calculating with said processor the calorie expenditure of the user further comprises calculating with said processor the calorie expenditure of the user based on the weight of said drum sticks.

16. A drumming exercise system comprising:
one or more elongate objects configured for holding and moving by a user;
a plurality of drum pads each defining a striking surface;
a sensor operatively connected to each drum pad for detecting drumming motions of said one or more elongate objects when said one or more elongate objects are moved by the user to strike said striking surface; and
a processor communicatively coupled to said sensor, wherein said processor is configured to:
determine which one of said plurality of drum pads is struck by the user when the user strikes said drum pads in a pattern;
use a known distance between each of said drum pads to estimate a distance moved by the user between each strike of each drum pad of said drum pads;
determine an amount of time between each strike of each drum pad when individual ones of said plurality of drum pads are struck by the user;
establish a rate at which said drum pads are struck by the user;
determine an intensity of each strike of the striking surface with said one or more elongate objects; and
calculate a calorie expenditure of the user based at least on the estimated distance moved by the user between each strike of each drum pad of said drum pads, the amount of time between each strike of each said drum pad, the intensity of each strike of each striking surface, and the rate at which said drum pads are struck by the user.

17. The system of claim 16, wherein said sensor comprises a plurality of sensors.

18. The system of claim 16, wherein said one or more elongate objects comprise a set of drum sticks used by the user with each drum stick including one or more motion sensors integrated into said drum sticks for detecting at least: (1) a movement of each drum stick, (2) a distance by which each drum stick is moved by the user, and (3) an amount of time between each movement of each drum stick, wherein the calorie expenditure is determined at least based on the distance, and the amount of time.

* * * * *